Dec. 5, 1939.     J. J. McDERMOTT     2,182,157
ROTARY CORN UNCOVERER
Filed May 18, 1939     3 Sheets-Sheet 3
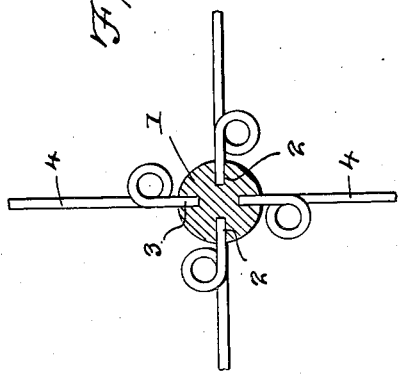
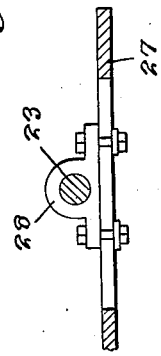
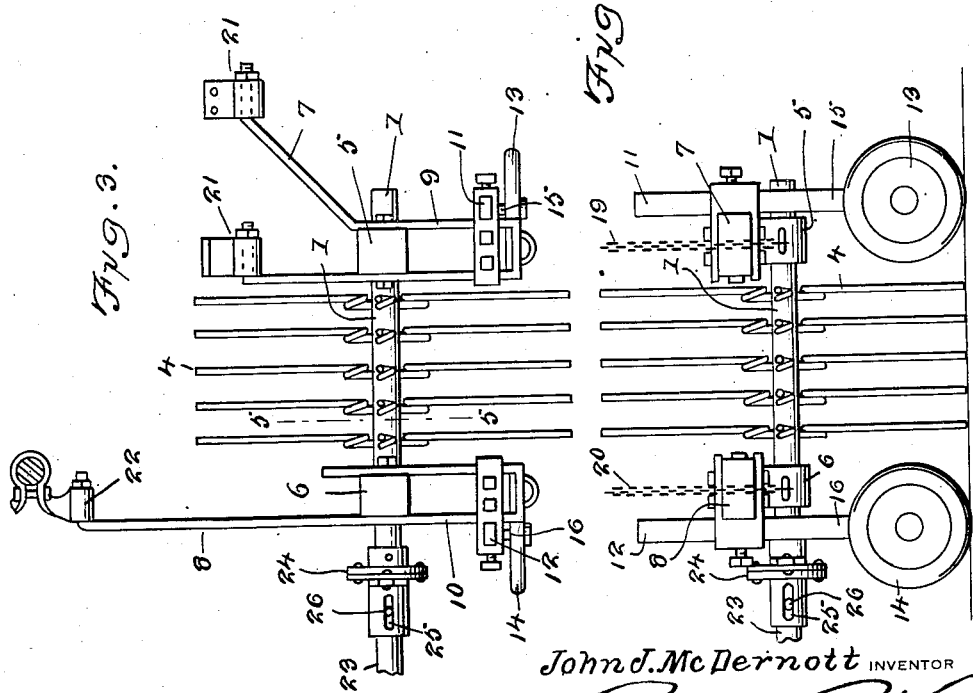
John J. McDermott INVENTOR Patented Dec. 5, 1939

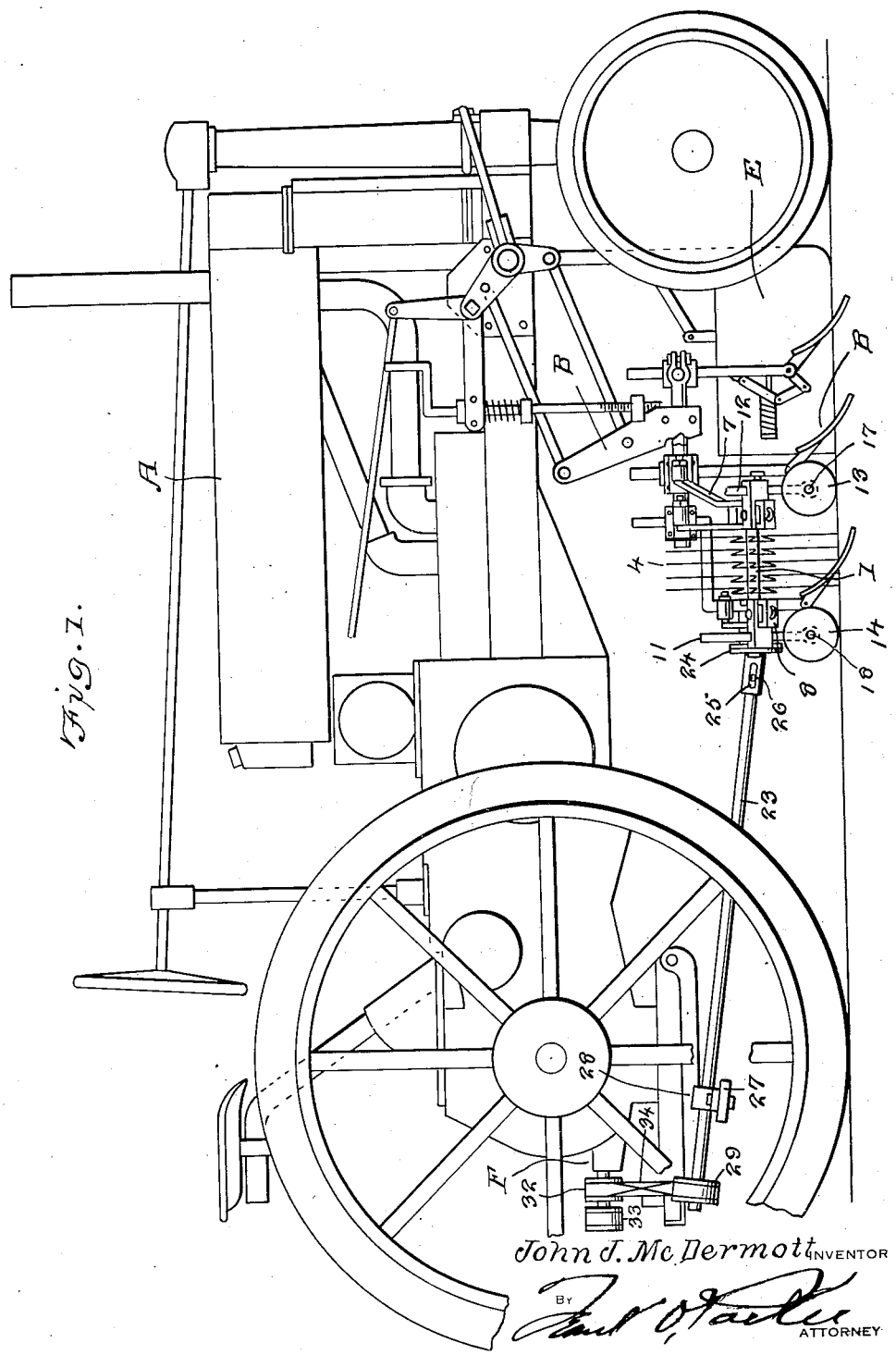

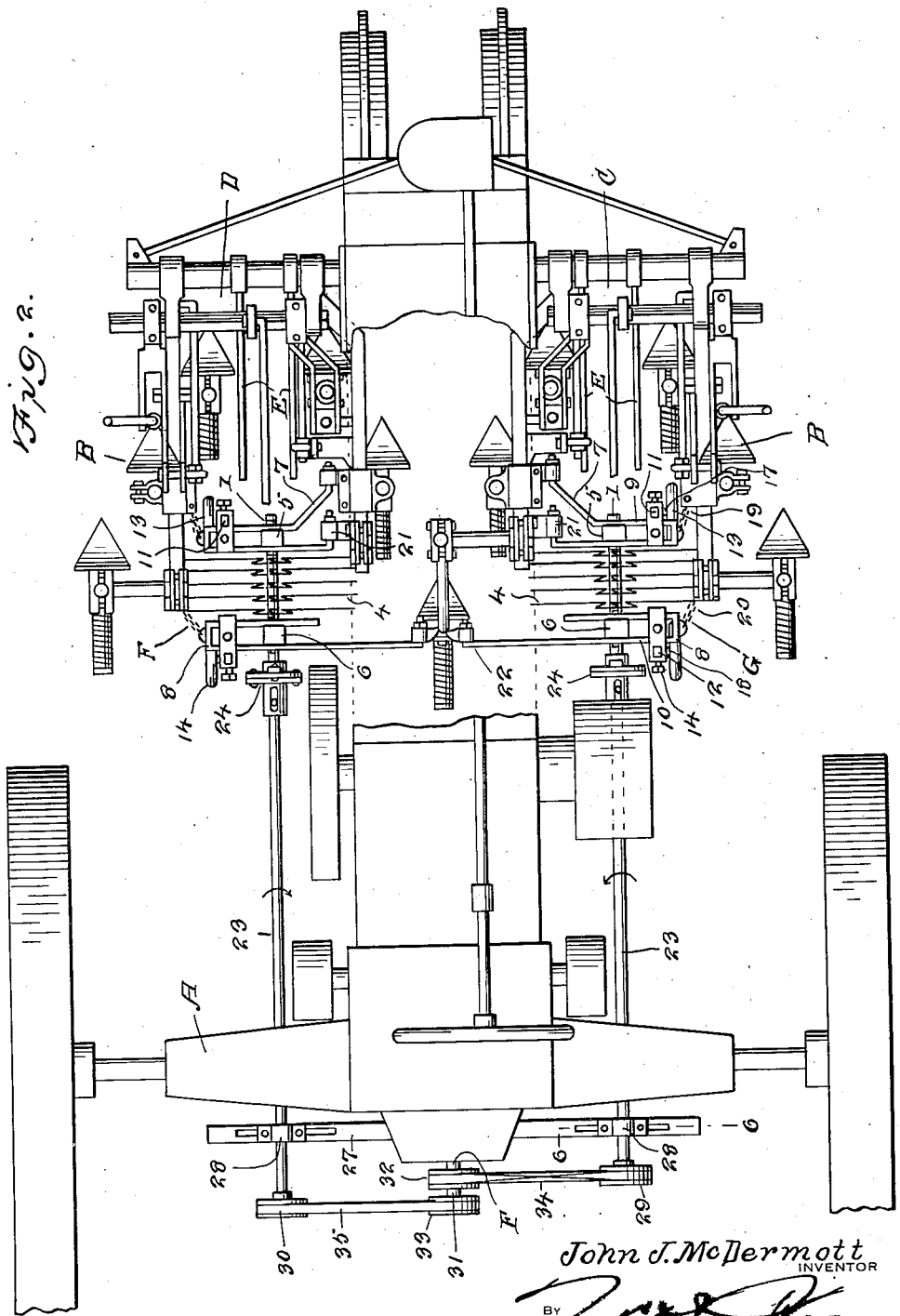

2,182,157

UNITED STATES PATENT OFFICE 2,182,157

ROTARY CORN UNCOVERER

John J. McDermott, Epworth, Iowa

Application May 18, 1939, Serial No. 274,443

9 Claims. (Cl. 97—38)

This invention relates to an uncoverer adapted for attachment to a tractor cultivator or corn plow, as it is commonly termed and not to a gang plow, and has for its primary object to not only uncover corn or other row crops covered during the cultivating period to save the same, but also for cultivating through the hill and the strip upturned by the cultivator thereby killing the incipient weeds, as well as cleaning corn choked by ivy.

A further object of the invention is to provide, in a manner as hereinafter set forth, an uncoverer for the purpose referred to including as a part thereof a revoluble uncovering element of toothed form bodily moving with a tractor cultivator, arranged immediately behind, aligning with and free of direct connection with the fender of the cultivator, revolubly driven from the tractor during the travel of the latter, and with such element disposed relative to the row of growing plants whereby the teeth of such element will revolve directly across, that is transversely across the row from the center of the tractor outwardly.

A further object of the invention is to provide, in a manner as hereinafter set forth an uncovering means for the purpose referred to for simultaneously acting upon all of the rows over which the tractor and cultivator move.

A further object of the invention is to provide, in a manner as hereinafter set forth, an uncovering means for the purpose referred to including a pair of revoluble toothed elements, one disposed relative to the right side of the cultivator and the other disposed in relation to the left side of the cultivator; when standing facing the rear of the tractor whereby it will appear that the teeth on the element to the right will revolve counterclockwise and the teeth on the element to the left will revolve clockwise.

A further object of the invention is to provide, in a manner as hereinafter set forth, an uncoverer for the purpose referred to for association with a tractor cultivator of generally conventional design and which may be further operatively connected to the tractor and supported from the cultivator without to any appreciable extent altering the construction of the tractor or cultivator.

Further objects of the invention are to provide, in a manner as hereinafter set forth, an uncoverer for the purpose referred to which is comparatively simple in its construction and arrangement, strong, durable, compact, thoroughly efficient in its use, readily assembled and expeditiously attached to the tractor and the cultivator, conveniently repaired when occasion requires, and comparatively inexpensive to manufacture.

Embodying the aforesaid objects and others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

The uncoverer as shown includes a pair of driven revoluble toothed uncovering elements, but these latter may be driven from the wheels of the tractor; by a power take-off from the tractor; or other suitable propelling devices, by way of example, the aforesaid elements are shown as being driven or operated by a power take-off from the tractor.

In the accompanying drawings:

Figure 1 is a side elevation of the uncoverer constructed in accordance with the invention and in association with a tractor.

Figure 2 is a top plan view partly in section.

Figure 3 is a fragmentary enlarged detailed plan view of the uncoverer.

Figure 4 is a side elevation thereof.

Figure 5 is a detailed sectional view taken on the line 5—5 of Figure 3.

Figure 6 is a fragmentary detailed elevation partly in section of one of the bearings of the uncoverer.

With reference to the drawings A designates a tractor of conventional form and B a cultivator or corn plow of conventional form. The cultivator B includes a pair of oppositely disposed right and left cultivating or plow units C, D and with each unit having associated therewith a fender E. The tractor A is provided with a power take-off F. The cultivator B is connected to the tractor A in a known manner to bodily travel with the latter when it is active. The connection being such that the cultivator may be elevated, when not in use and when transported by the tractor from one location to another.

The uncoverer as shown includes a pair of oppositely disposed structures F, G of like form which are interposed between the shovels of cultivator, C and D as well as being connected to the units C, D and through these latter to the tractor A. When the cultivator and uncoverer are not used or inactive and transported from one location to the other by the tractor, they are elevated, but during transportation the revoluble elements of the uncoverer are revolved, but do no useful work.

Each of the structures F, G includes a revoluble uncovering element formed of a driven shaft 1 having spaced lengthwise parallel rows of spaced aligned sockets 2. Secured in each socket 2 is the shank 3 of an outwardly directed spring steel uncovering tooth 4. Preferably the number of rows of sockets will be four and the number of the sockets of each row five. The teeth 4 are disposed in rows arranged radially of the shaft 1. The sockets of one row are disposed in parallel relation with respect to the sockets of an adjacent row whereby the teeth of one radial row are arranged in parallel relation with respect to the teeth of an adjacent radial row. The shaft 1 is mounted in a pair of spaced aligned bearings 5, 6. The bearing 5 is supported by a frame 7. The bearing 6 is supported by a frame 8. The bearings 5, 6 are to be slidably adjustable on their frames so the teeth on shaft 1 strike the ground directly behind the fenders of the cultivator, but are in no way connected to the fenders. The shaft 1 extends from the bearing 6 to beyond frame 8. The bearings 5, 6 are spaced inwardly on the frames 7, 8 respectively from the outer ends of such frames. The portions of the frames 7, 8 arranged outwardly of the bearings 5, 6 are indicated at 9, 10 respectively. The frame 8 extends inwardly with respect to the inner end of frame 7. Connected to the said portions 9, 10 are depending adjustable hanger devices 11, 12 respectively for wheels 13, 14 respectively for supporting the outer side of the structure F or G. The devices 11, 12 are so set up and so formed as to provide for the inward, outward and vertical adjustments thereof with respect to the frames 7, 8. The devices 11, 12 have their lower portions 15, 16 respectively of angular contour with the parts thereof 17, 18 respectively extending in opposite directions and carrying the wheels 13, 14 respectively. The outer ends of the frames 7, 8 are connected by loose chains 19, 20 respectively to one of the units of the cultivator. The inner end of frame 7 is suitably hinged to the said unit, as at 21. The inner ends of the frames 8 of the structures F, G are suitably hinged to the cultivator, as at 21 whereby the frames 8 are connected together.

Each of the structures F, G includes a driving shaft 23 for the shaft 1 thereof. The shaft 23 is connected to the shaft 1 by a flexible knuckle 24, which is suitably connected to the shaft 23. The latter is formed with a slot 25 and the knuckle 24 is formed with a pin 26 which extends through slot 25. The shaft 23 may be termed a transmission shaft or driving means. One of the sections of the knuckle 24 is fixed to shaft 1 and the other section thereof slidably connected to the shaft 23.

Attached to the tractor A is a supporting bar 27 having adjustably connected thereon in proximity to each of its ends a bearing 28. The shafts 23 are mounted on and extend forwardly from the bearings 28. The forward ends of the shaft 23 are provided with V-pulleys. These pulleys are indicated at 29, 30.

The power take-off from tractor A may be connected with any suitable driven part of the transmission of the tractor, and it may be of any suitable construction for the purpose desired, by way of example, it is shown as consisting of a shaft 31 suitably driven from the transmission of the tractor, extended forwardly from the latter and provided with a pair of V-pulleys 32, 33. Leading from the pulley 32 to the pulley 29 is a twisted power transmission belt 34 of V-form, and leading from pulley 33 to the pulley 30 is a twisted power transmission belt 35 of V-form.

The uncoverer is connected to the cultivator, and it is partly supported by the cultivator and partly supported by the wheels 13, 14. These latter are adjustable horizontally and vertically. The chains, when the uncoverer is active hang loosely and allow freedom of action of the wheels aforesaid. The chains also act to pick the wheels of the uncoverer off of the ground when the cultivator is raised, but when raised the structures E, F continue to operate due to the power take-off. The slack in the chains allows the uncoverer to maneuver over uneven ground, independent of the cultivator, but when the latter is raised the slack comes out of the chains and then the uncoverer raises with the cultivator.

The pin and slot connections between the knuckles and the shafts 23 allow for the knuckles to move forward and backward on shafts 23, thus eliminating binding on the up or down movements of the shafts 1.

The bearings 28 are slidably adjustable on the support or bar 27 thus allowing belt slack to be taken up. The connection of the bearings 28 to bar 27 may be of any suitable form to permit of the in or out movements of the bearings 28 relative to bar 27.

The bearings and wheels are to be provided with suitable lubricant supply means of known form.

The speed of the shafts 1 is to be such that the teeth on such shafts strike all of the rows over which the tractor and cultivator move. The teeth on the shafts 1 revolve right in the row for the primary purpose of uncovering corn or other row crops covered by any method of cultivation and which results in the saving of corn already planted and growing, that would be destroyed by covering caused during the cultivating period.

The uncoverer will operate on any cultivator with or without fenders, the latter being not necessary for successful operation of the said uncoverer although the operation is successful with the fenders on the cultivator.

What I claim is:

1. An uncoverer for the purpose set forth and for use in connection with a tractor cultivator having a fender, said uncoverer comprising a structure having as a part thereof a revoluble toothed uncovering element adapted for alignment with and free of connection to the fender of the cultivator and for disposing over and for acting directly on a row of growing plants for uncovering said row following the activity of the cultivator, said structure including wheels for supporting the outer side thereof, a driving means for said element and means for loosely connecting the outer side of said structure to the cultivator, means for connecting the inner side of said structure to the cultivator, and means for operating said element.

2. The invention as set forth in claim 1 having said structure provided with adjustable hangers for said wheels and adjustable bearings for said element.

3. The invention as set forth in claim 1 having said revoluble element in the form of a shaft provided on its periphery with lengthwise extending spaced rows of radially disposed spaced teeth, the teeth of one row being disposed in parallel relation with respect to the teeth of an adjacent row.

4. An uncoverer for the purpose set forth and for use with a tractor cultivator having a pair of spaced cultivating units provided with fenders, said uncoverer including a pair of structures each for disposing in relation to a cultivator unit, each of said structures having as a part thereof a revoluble toothed uncovering element adapted for disposing rearwardly of, spaced from and free of connection to a fender, and for disposing over and for acting directly on a row of growing plants for uncovering such row following the activity of the cultivator, each of said structures including spaced wheels for supporting the outer side thereof, a driving means for its revoluble element and means for loosely connecting its outer side to a cultivator unit, means for connecting the inner side of each structure to a cultivator unit, bearings for the driving means of said structures adapted to be supported from the tractor, and means adapted to be operated from the tractor and common to and operating simultaneously the driving means of said structures to provide for the operation of the toothed elements in unison.

5. The invention as set forth in claim 4 having said structures provided with adjustable hangers for said wheels and adjustable bearings for said elements.

6. The invention as set forth in claim 4 having said revoluble elements in the form of horizontally disposed shafts provided on their peripheries with lengthwise extending spaced rows of radially disposed resilient teeth, the teeth of one row being disposed in parallel relation with respect to the teeth of an adjacent row.

7. The invention as set forth in claim 4 having the bearings for the driving means of said structures adjustable, adjustable bearings for said elements and adjustable hangers for said wheels.

8. An uncoverer for the purpose set forth and for use in connection with a tractor cultivator having a fender, said uncoverer comprising a structure having as a part thereof a revoluble toothed uncovering element adapted for alignment with and free of connection to the fender of the cultivator and for disposing over and for acting directly on a row of growing plants for uncovering said row following the activity of the cultivator, said structure including wheels for supporting the outer side thereof, a driving means for said element and means for loosely connecting the outer side of said structure to the cultivator, means for connecting the inner side of said structure to the cultivator, and means for operating said element, and a flexible knuckle for coupling said element to said driving means, said knuckle being fixed to said element and slidably connected to said driving means.

9. An uncoverer for the purpose set forth and for use with a tractor cultivator having a pair of spaced cultivating units provided with fenders, said uncoverer including a pair of structures each for disposing in relation to a cultivator unit, each of said structures having as a part thereof a revoluble toothed uncovering element adapted for disposing rearwardly of, spaced from and free of connection to a fender, and for disposing over and for acting directly on a row of growing plants for uncovering such row following the activity of the cultivator, each of said structures including spaced wheels for supporting the outer side thereof, a driving means for its revoluble element and means for loosely connecting its outer side to a cultivator unit, means for connecting the inner side of each structure to a cultivator unit, bearings for the driving means of said structures adapted to be supported from the tractor, means adapted to be operated from the tractor and common to and operating simultaneously the driving means of said structures to provide for the operation of the toothed elements in unison, and flexible knuckles coupling said elements to the said driving means therefor, said knuckles being fixed to said elements and slidably connected to said driving means.

JOHN J. McDERMOTT.